(12) United States Patent
Ding et al.

(10) Patent No.: US 9,665,227 B2
(45) Date of Patent: May 30, 2017

(54) BUILT-IN TOUCH DISPLAY DEVICE AND METHOD FOR DRIVING THE SAME

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaoliang Ding, Beijing (CN); Xue Dong, Beijing (CN); Haisheng Wang, Beijing (CN); Yingming Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 20 days.

(21) Appl. No.: 14/761,573

(22) PCT Filed: Oct. 24, 2014

(86) PCT No.: PCT/CN2014/089381
§ 371 (c)(1),
(2) Date: Jul. 16, 2015

(87) PCT Pub. No.: WO2016/004703
PCT Pub. Date: Jan. 14, 2016

(65) Prior Publication Data
US 2016/0282981 A1 Sep. 29, 2016

(30) Foreign Application Priority Data
Jul. 10, 2014 (CN) .......................... 2014 1 0328151

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 3/0416* (2013.01); *G06F 2203/04107* (2013.01)

(58) Field of Classification Search
CPC ................... G06F 3/0412; G06F 3/047; G06F 2203/04112; G06F 3/041; G06F 3/044;
(Continued)

(56) References Cited

U.S. PATENT DOCUMENTS

2008/0158493 A1* 7/2008 Park ...................... G02F 1/1339
349/139
2010/0188361 A1* 7/2010 Kim ..................... G02F 1/13338
345/174

(Continued)

FOREIGN PATENT DOCUMENTS

CN 102830879 A 12/2012
CN 103049157 A 4/2013
(Continued)

OTHER PUBLICATIONS

CN 103226423A (abstract).*
(Continued)

*Primary Examiner* — Hong Zhou
(74) *Attorney, Agent, or Firm* — Harness, Dickey & Pierce, P.L.C.

(57) ABSTRACT

The present disclosure provides a built-in touch display device and a method for driving the same. Each of a plurality of shielding layers may be arranged between each of the plurality of data lines and each of a plurality of touch driving electrodes. A touch driving signal may be transmitted to the corresponding touch driving electrode when the plurality of
(Continued)

first gate line groups corresponding to the common electrodes is in an ON state, and the transmitting of the touch driving signal to the corresponding touch driving electrode may be stopped when the plurality of second gate line groups corresponding to the touch driving electrodes is in an ON state.

20 Claims, 6 Drawing Sheets

(58) Field of Classification Search
CPC ......... G06F 2203/04107; G06F 3/0416; G02F 1/13338; G02F 1/136286; G02F 2001/134318
See application file for complete search history.

(56) References Cited

U.S. PATENT DOCUMENTS

| | | | |
|---|---|---|---|
| 2012/0105752 A1* | 5/2012 | Park | G02F 1/13338 349/33 |
| 2012/0313881 A1 | 12/2012 | Ge et al. | |
| 2013/0293498 A1* | 11/2013 | Kim | G06F 3/0412 345/173 |
| 2013/0307820 A1* | 11/2013 | Kim | G06F 3/044 345/174 |
| 2014/0104510 A1* | 4/2014 | Wang | G06F 3/0412 349/12 |
| 2014/0167160 A1* | 6/2014 | Chen | H01L 27/124 257/347 |
| 2014/0362031 A1* | 12/2014 | Mo | G09G 3/36 345/174 |
| 2016/0077624 A1* | 3/2016 | Zhao | H04L 45/245 345/174 |

FOREIGN PATENT DOCUMENTS

| | | |
|---|---|---|
| CN | 103186426 A | 7/2013 |
| CN | 103226423 A | 7/2013 |
| CN | 103455201 A | 12/2013 |

OTHER PUBLICATIONS

First Office Action regarding Chinese application No. 201410328151.X, dated Sep. 18, 2016. Translation provided by Dragon Intellectual Property Law Firm.
Written Opinion of the International Searching Authority for international application No. PCT/CN2014/089381.

\* cited by examiner

BUILT-IN TOUCH DISPLAY DEVICE AND METHOD FOR DRIVING THE SAME

CROSS REFERENCE OF RELATED APPLICATION APPLICATIONS

The present application is the U.S. national phase of PCT Application No. PCT/CN2014/089381 filed on Oct. 24, 2014, which claims the priority of Chinese patent application 201410328151.X filed in China on Jul. 10, 2014, the disclosures of both of which are incorporated herein by reference.

TECHNICAL FIELD

The present disclosure relates to a technical field of displaying, and more particular to a built-in touch display device and a method for driving the same.

BACKGROUND

A touch screen, as an input interface, provides a user with a more convenient means for inputting information than a keyboard or a mouse. Based on their working principles, the touch screens include a resistive type of touch screen, a capacitive type of touch screen, a surface acoustic wave type of touch screen, an infrared type of touch screen and etc. Until now, the resistive type of touch screen and the capacitive type of touch screen have been the ones that are commonly used.

The capacitive type of touch screens includes a surface capacitance touch screen, a projection self capacitance touch screen, a projection mutual capacitance touch screen, a single layer capacitance touch screen and etc. Among these touch screens, the projection mutual capacitance touch screen is prevailing for its merits of high sensitivity and multiple touches. A basic working principle of the projection mutual capacitance touch screen lies in detecting variations of signals on sides of detecting lines upon applying voltages on sides of driving lines. The driving lines determine X-axes of coordinates, and the detecting lines determine Y-axes of the coordinates. During the detection, the driving lines in the X-axes direction are scanned row by row, and upon scanning each row of the driving lines, the signal on each detecting line is read. Thus, all of the intersection points of rows and columns of the lines are scanned by a round of scanning, and X*Y signals are obtained accordingly. Such detection may determine the coordinates of a plurality of points, so that the multiple touches are implemented.

Conventionally, the commonly used projection mutual capacitance touch screen is a built-in projection mutual capacitance touch screen, which is driven based on time sequence, i.e. the driving of the display and the driving of the touch signal detection are implemented asynchronously. During a portion of a time period (for example, a time period of a frame), the scanning of the display driving signals is implemented, while the detecting of the touch signals is not implemented; and during the other portion of the time period, the detecting of the touch signals is implemented, while the scanning of the display driving signals is not implemented.

In such conventional driving based on time sequence, the time duration for detecting of the touch signals is short, and thus the frequency for detecting of the touch signals is high, which increases internal noises of the touch display device and deteriorates the display quality of the touch display devices.

SUMMARY

In view of the above problem, the present disclosure provides a built-in touch display device and a method for driving the same to improve the display quality of the touch display device.

The solutions of the present disclosure are as follows.

In an aspect of the present disclosure, it is provided a built-in touch display device, including a first substrate, on which a plurality of data lines, and a plurality of common electrodes and a plurality of touch driving electrodes arranged to be spaced apart from each other and in an alternate manner on a same layer, are provided, wherein the plurality of common electrodes corresponds to a plurality of first gate line groups respectively, and the plurality of touch driving electrodes corresponds to a plurality of second gate line groups respectively;

the first substrate may further include:

a plurality of shielding layers, each of which is arranged between each of the plurality of data lines and each of the plurality of touch driving electrodes; and a plurality of touch driving signal transmission lines, arranged in one-to-one correspondence with the plurality of touch driving electrodes, wherein each of the touch driving signal transmission lines is electrically connected to a corresponding one of the plurality of touch driving electrodes, and configured to transmit a touch driving signal to the corresponding touch driving electrode when the plurality of first gate line groups corresponding to the common electrodes is in an ON state, and stop transmitting the touch driving signal to the corresponding touch driving electrode when the plurality of second gate line groups corresponding to the touch driving electrodes is in an ON state.

Alternatively, the shielding layers may each include a plurality of stripe patterns.

Alternatively, one of the plurality of data lines may correspond to one of the plurality of stripe patterns;

a projection region of the one data line on the first substrate may be within a projection region of the one stripe pattern corresponding to the data line on the first substrate.

Alternatively, one of the plurality of data lines may correspond to the plurality of stripe patterns;

the plurality of stripe patterns corresponding to the one data line may be arranged on the shielding layer at a position corresponding to a region where a projection of the one data line overlaps a projection of the corresponding touch driving electrode.

Alternatively, the shielding layers may be each made of a transparent and conductive material.

Alternatively, the shielding layers may be each made of Indium Tin Oxide (ITO).

Alternatively, each of the shielding layers may be connected to a corresponding signal input end having a constant level.

Alternatively, the signal input end may be one of the common electrodes.

Alternatively, the built-in touch display device may further include:

a counter, arranged to count a row number of a gate line being in the ON state currently;

a determination module, arranged to determine whether the gate line being in the ON state currently belongs to the first gate line group or the second gate line group based on the row number counted by the counter; and a control module, arranged to send a first signal to a touch chip for controlling the touch chip to transmit the touch driving signal to a corresponding one of the touch driving signal transmission lines when the determination module determines that a gate line being in the ON state currently belongs to the first gate line groups, and send a second signal to a touch chip for controlling the touch chip to stop transmitting the touch driving signal to the corresponding one of the touch driving signal transmission lines when the determination module determines that the gate line being in the ON state currently belongs to the second gate line groups.

Alternatively, the control module may be connected to a high level input end and a low level input end respectively;

when the determination module determines that the gate line being in the ON state currently belongs to the first gate line groups, the control module is electrically connected to the high level input end, and transmits a high level signal inputted by the high level input end to the touch chip; and when the determination module determines that the gate line being in the ON state currently belongs to the second gate line groups, the control module is electrically connected to the low level input end, and transmits a low level signal inputted by the low level input end to the touch chip.

Alternatively, the counter, the determination module and the control module may be integrated in a data dictionary of the built-in touch display device.

Alternatively, the built-in touch display device may further include a second substrate;

a plurality of detection electrodes may be provided on the second substrate.

Alternatively, the detection electrodes and the touch driving electrodes may intersect at a substantially right angle.

In another aspect of the present disclosure, it is further provided a method for driving a built-in touch display device including steps of:

counting a row number of a gate line being in the ON state currently;

determining whether the gate line being in the ON state currently belongs to first gate line groups or second gate line groups based on the row number, wherein the first gate line groups correspond to common electrodes respectively, the second gate line groups correspond to touch driving electrodes respectively, and the common electrodes and the touch driving electrodes are arranged to be spaced apart from each other on a same layer and in an alternate manner; and controlling a touch chip to transmit a touch driving signal to a corresponding touch driving signal transmission line when the gate line being in the ON state currently belongs to the first gate line groups, and controlling the touch chip to stop transmitting the touch driving signal to the corresponding touch driving signal transmission line when the gate line being in the ON state currently belongs to the second gate line groups.

Alternatively, the step of controlling the touch chip to transmit the touch driving signal to the corresponding touch driving signal transmission line may include:

transmitting a high level signal to the touch chip to control the touch chip to transmit the touch driving signal to the corresponding touch driving signal transmission line.

Alternatively, the step of controlling the touch chip to stop transmitting the touch driving signal to the corresponding touch driving signal transmission line may include:

transmitting a low level signal to the touch chip to control the touch chip to stop transmitting the touch driving signal to the corresponding touch driving signal transmission line.

It can be seen from above that the present disclosure provides a built-in touch display device and a method for driving the same. Each of a plurality of shielding layers is arranged between each of the plurality of data lines and each of a plurality of touch driving electrodes. A touch driving signal is transmitted to the corresponding touch driving electrode when the plurality of first gate line groups corresponding to the common electrodes is in an ON state, and the transmitting of the touch driving signal to the corresponding touch driving electrode is stopped when the plurality of second gate line groups corresponding to the touch driving electrodes is in an ON state. As a result, the display driving and the touch detecting are implemented simultaneously, so that the time duration for the touch detecting is prolonged, and the frequency for transmitting the touch detecting signals is reduced. Thus, the noises of the touch display device are reduced, and the display quality of the touch display device is improved.

DETAILED DESCRIPTION

In order to make the objects, the technical solutions and the advantages of the present disclosure more apparent, some technical solutions of the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "a" are merely used to represent the existence of at least one member, rather than to limit the number thereof. Such words as "connect" or "connected to"

may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
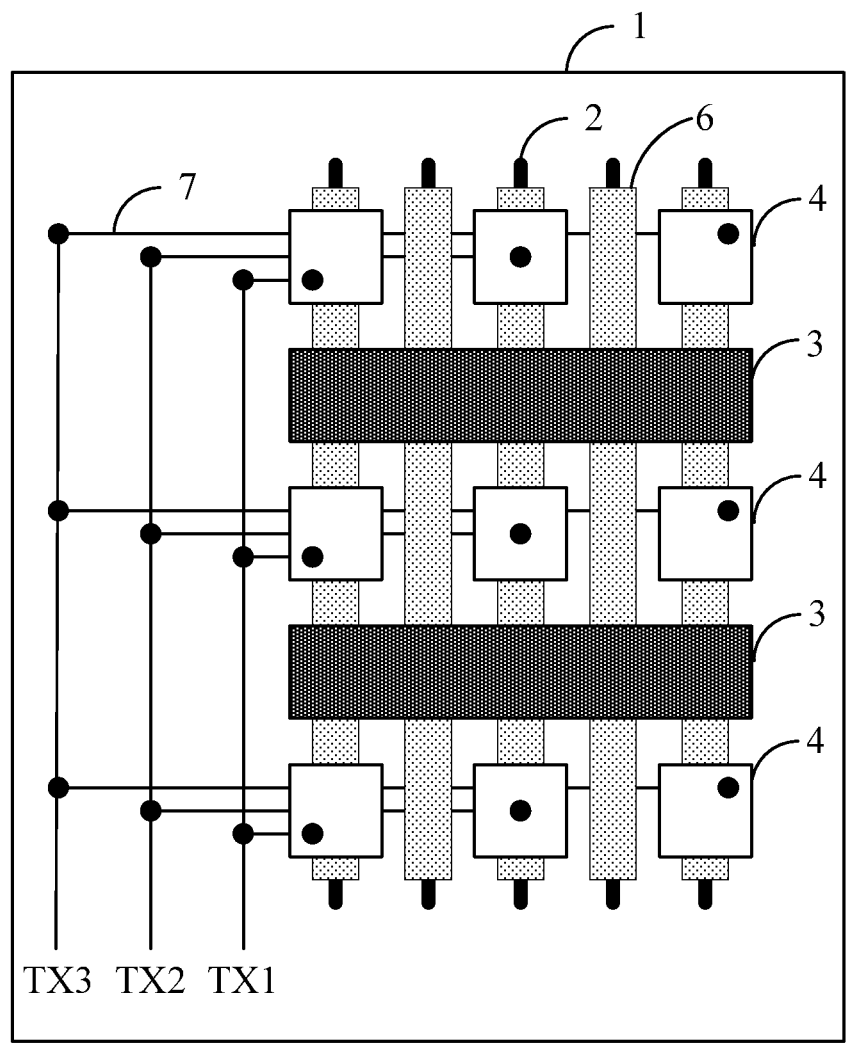
FIG. 1 is a first drawing illustrating a structure of a first substrate in a built-in touch display device according to an embodiment of the present disclosure.
Figure 2:
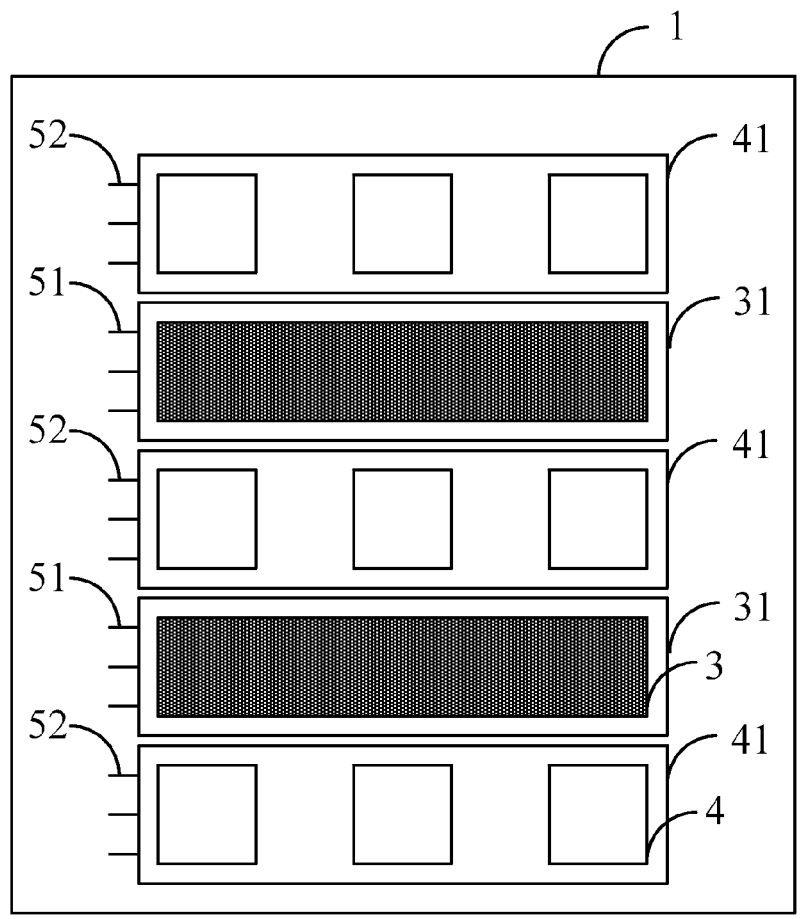
FIG. 2 is a second drawing illustrating the structure of the first substrate in the built-in touch display device according to another embodiment of the present disclosure.

As illustrated in FIG. 1, in an embodiment of the present disclosure, it is provided a built-in touch display device including a first substrate 1, on which a plurality of gate lines (not shown in FIG. 1) and a plurality of data lines 2, and a plurality of common electrodes 3 and a plurality of touch driving electrodes 4 arranged to be spaced apart from each other and in an alternate manner on a same layer, are provided, wherein the plurality of common electrodes 3 corresponds to a plurality of first gate line groups 51 (as illustrated in FIG. 2) respectively, and the plurality of touch driving electrodes 4 corresponds to a plurality of second gate line groups 52 (as illustrated in FIG. 2) respectively;

as illustrated in FIG. 1, the first substrate 1 may further include:

a plurality of shielding layers 6, each of which is arranged between each of the plurality of data lines 2 and each of the plurality of touch driving electrodes 4; and a plurality of touch driving signal transmission lines 7, arranged in one-to-one correspondence with the plurality of touch driving electrodes 4, wherein each of the touch driving signal transmission lines 7 is electrically connected to a corresponding one of the plurality of touch driving electrodes 4, and configured to transmit a touch driving signal to the corresponding touch driving electrode 4 when the plurality of first gate line groups 51 corresponding to the common electrodes 3 is in an ON state, and stop transmitting the touch driving signal to the corresponding touch driving electrode 4 when the plurality of second gate line groups 52 corresponding to the touch driving electrodes 4 is in an ON state.

As illustrated in FIG. 2, in the built-in touch display device, based on the coverage of the common electrodes 3 and the touch driving electrodes 4 arranged to be spaced apart from each other on the first substrate 1 and in an alternate manner, the first substrate 1 may be divided into a plurality of common electrode regions 31 (Vcom segments) and a plurality of touch driving electrode regions 41 (TX segments) arranged to be spaced apart from each other and in an alternate manner.

Furthermore, in this embodiment, the gate lines on the common electrode regions and the touch driving electrode regions are divided into two groups, wherein the gate lines within the coverage of the common electrodes 3 belong to the first gate line groups 51, and the gate lines within the coverage of the touch driving electrodes 4 belong to the second gate line groups 52.

During a time period (for example, a time period of a frame), when the gate lines in the first gate groups 51 are in an ON state, i.e. transmitting the gate driving signals, the regions for the display driving may not be overlapped with the regions for the touch detecting because the gate lines of the first gate line groups 51 are within the coverage of the common electrodes 3 instead of the coverage of the touch driving electrodes 4. Thus, at this point, the touch driving signals may be transmitted to the touch driving electrodes 4 by the corresponding touch driving signal transmitting lines 7, i.e. the touch detecting may be activated, so that the display driving and the touch detecting may be implemented simultaneously. In addition, when the gate lines in the second gate groups 52 are in an ON state, i.e. transmitting the gate driving signals, the regions for the display driving may be overlapped with the regions for the touch detecting because the gate lines of the second gate line groups 52 are within the coverage of the touch driving electrodes 4. Thus, the touch driving signals may be stopped being transmitted to the touch driving electrodes 4 by the corresponding touch driving signal transmitting lines 7, i.e. the touch detecting may be deactivated, so as to avoid the adverse effects of the display driving and the touch detecting on each other due to the overlapping of the regions. As a result, the adverse effects of the display driving and the touch detecting on each other may be avoided.

Figure 3:
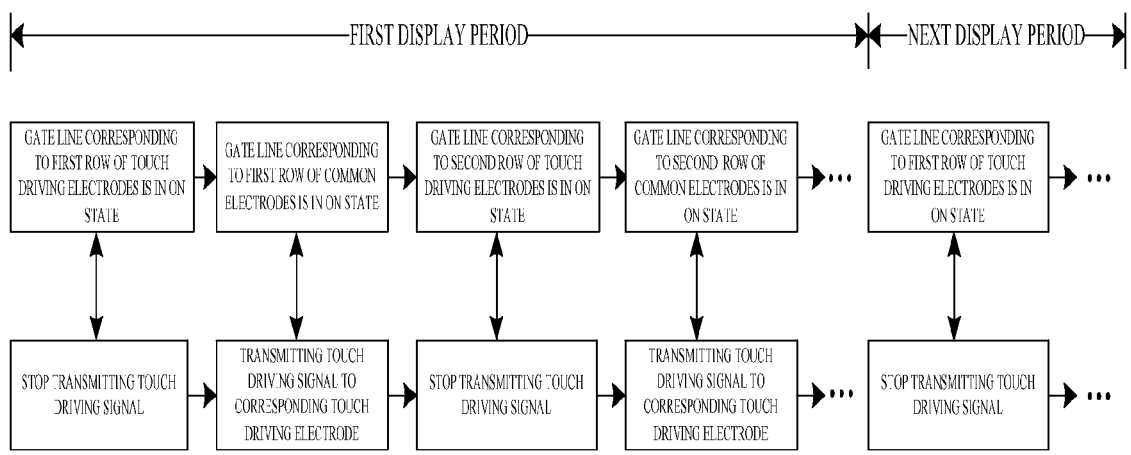
FIG. 3 illustrates driving time sequence of the built-in touch display device according to the embodiment of the present disclosure.

FIG. 3 illustrates driving time sequence of the built-in touch display device according to the embodiment of the present disclosure. More particularly, when any gate line of the second gate line groups 52 corresponding to the first row of the touch driving electrodes 4 is in the ON state, the touch driving signals may not be transmitted to any of the touch driving signal transmission lines 7, i.e. the touch driving signals are stopped being transmitted to the touch driving electrodes 4; in contrast, when any gate line of the first gate line group 51 corresponding to the first row of the common electrodes 3 is in the ON state, the touch driving signals may be transmitted to the first touch driving signal transmission lines (TX1) connected to the first column of an array of touch driving electrode blocks, so as to implement the touch detecting on the first column of the array.

Figure 4:
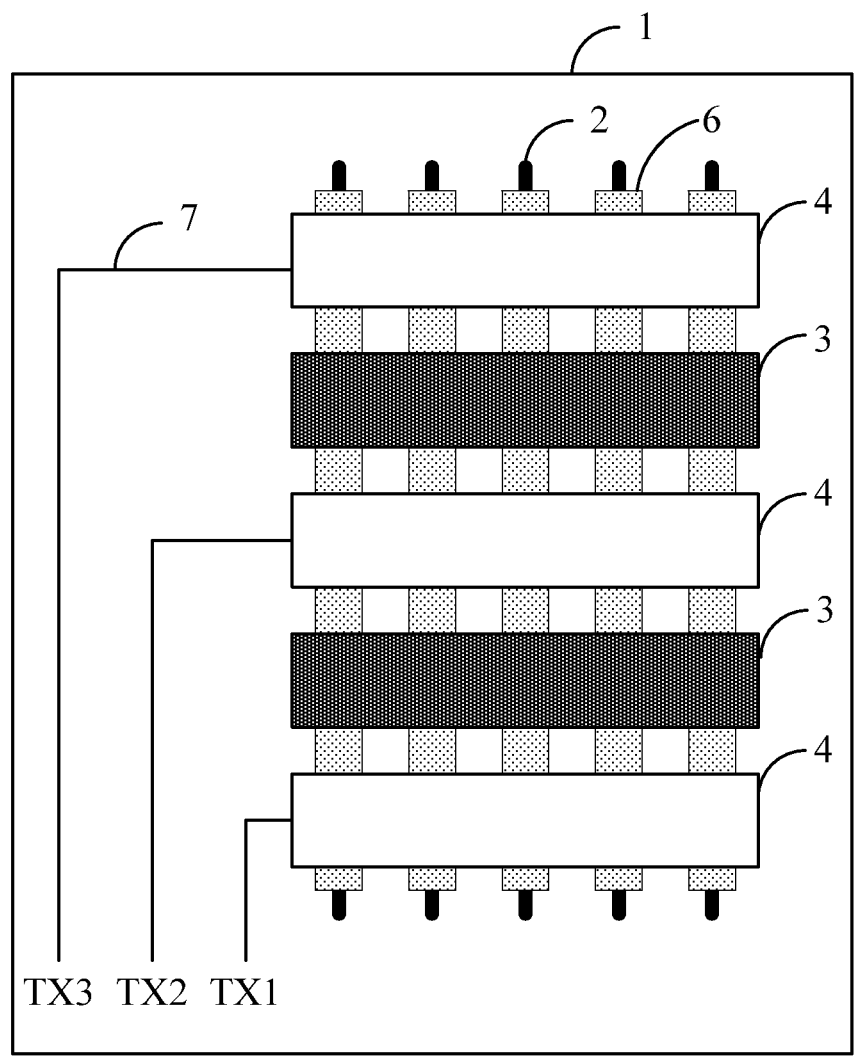
FIG. 4 is a third drawing illustrating the structure of the first substrate in the built-in touch display device according to yet another embodiment of the present disclosure.

As illustrated in FIGS. 1 and 2, in this embodiment, the touch driving electrodes 4 each may include the array of the touch driving electrode blocks consisted of a plurality of electrode blocks. Alternatively, as illustrated in FIG. 4, in another embodiment, the touch driving electrodes 4 each may include a plurality of metal stripe patterns with shapes similar to the shapes of the common electrodes 3, wherein each touch driving signal transmission line 7 is connected to a metal strip of a corresponding touch driving electrode 4. When one gate line of a particular first gate line group 51 corresponding to the particular first common electrode 3 as illustrated in FIG. 4 is in the ON state, the touch driving signals may be transmitted to the third touch driving signal transmission lines (TX3) connected to the first row of touch electrodes 4, so as to implement the touch detecting on the first row of the touch driving electrodes 4.

In this embodiment, as illustrated in FIG. 2, the gate lines may be scanned row by row (progressive scanning) in a direction from top to bottom, i.e. turned to be in the ON state row by row. As a result, the display driving and the touch detecting may be implemented alternately in terms of the sequence of the regions 41 of the touch electrodes 4 and the regions 31 of the common electrodes 3.

Thus, as illustrated in FIG. 2, during the time period, the simultaneously implementing of the display driving and the touch detecting may occur several times, i.e. the touch detecting may be implemented several times during one time period, so that the time duration for the touch detecting is significantly prolonged, and the frequency for transmitting the touch detecting signals is reduced. Thus, the noises of the touch display device are reduced, and the display quality of the touch display device is improved.

It can be seen from above that, in the built-in touch display device of this embodiment, the display driving may be implemented by scanning row by row, while the touch detecting may be implemented by scanning row by row or scanning column by column.

In this embodiment, the correspondence between the common electrodes 3 and the first gate line groups 51, and the correspondence between the touch driving electrodes 4 and the second gate line groups 52 may be established based on the coverage of the control driving electrodes 4 or the common electrodes 3 as the correspondence. Alternatively, in another embodiment, the correspondence between the common electrodes 3 and the first gate line groups 51, and the correspondence between the touch driving electrodes 4 and the second gate line groups 52 may be established based on, for example the row numbers of the gate lines.

In this embodiment, it may be determined whether the gate line being in the ON state currently belongs to the first gate line group 51 or the second gate line group 52 based on the position of the gate line being in the ON state. More particularly, since the gate lines on the first substrate 1 are arranged in order, it may be determined which group that the gate line being in the ON state currently belongs to based on the row number of the gate line being in the ON state currently; and then based on the result of such determination, it may be determined whether or not to transmit the touch driving signal to the corresponding touch driving electrode 4.

Figure 5:
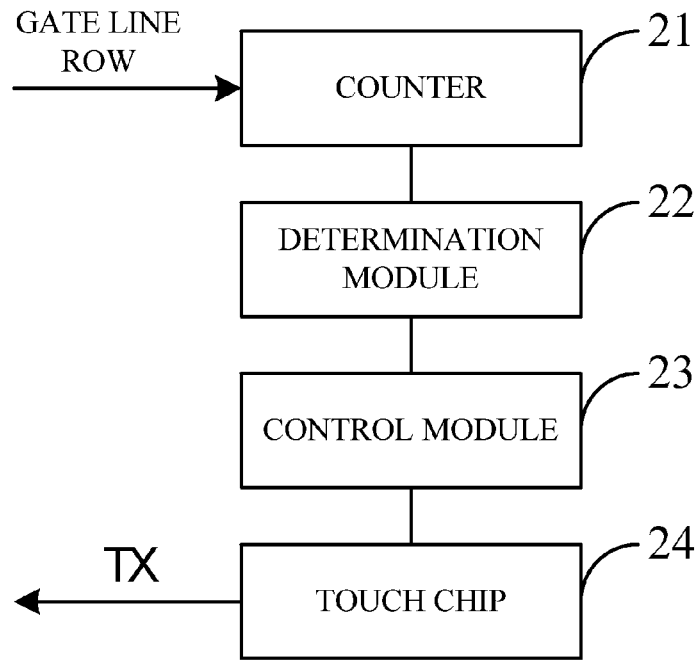
FIG. 5 is a first drawing illustrating a structure of the built-in touch display device according to an embodiment of the present disclosure.

Thus, as illustrated in FIG. 5, in another embodiment of the present disclosure, the built-in touch display device may further include:

a counter 21, arranged to count a row number of a gate line being in the ON state currently;

a determination module 22, arranged to determine whether the gate line being in the ON state currently belongs to the first gate line groups 51 or the second gate line groups 52 based on the row number counted by the counter 21; and a control module 23, arranged to send a first signal to a touch chip 24 for controlling the touch chip 24 to transmit the touch driving signal to a corresponding one of the touch driving signal transmission lines 7 when the determination module 22 determines that a gate line being in the ON state currently belongs to the first gate line groups 51, and send a second signal to the touch chip 24 for controlling the touch chip 24 to stop transmitting the touch driving signal to the corresponding one of the touch driving signal transmission lines 7 when the determination module 22 determines that the gate line being in the ON state currently belongs to the second gate line groups 52.

Figure 6:
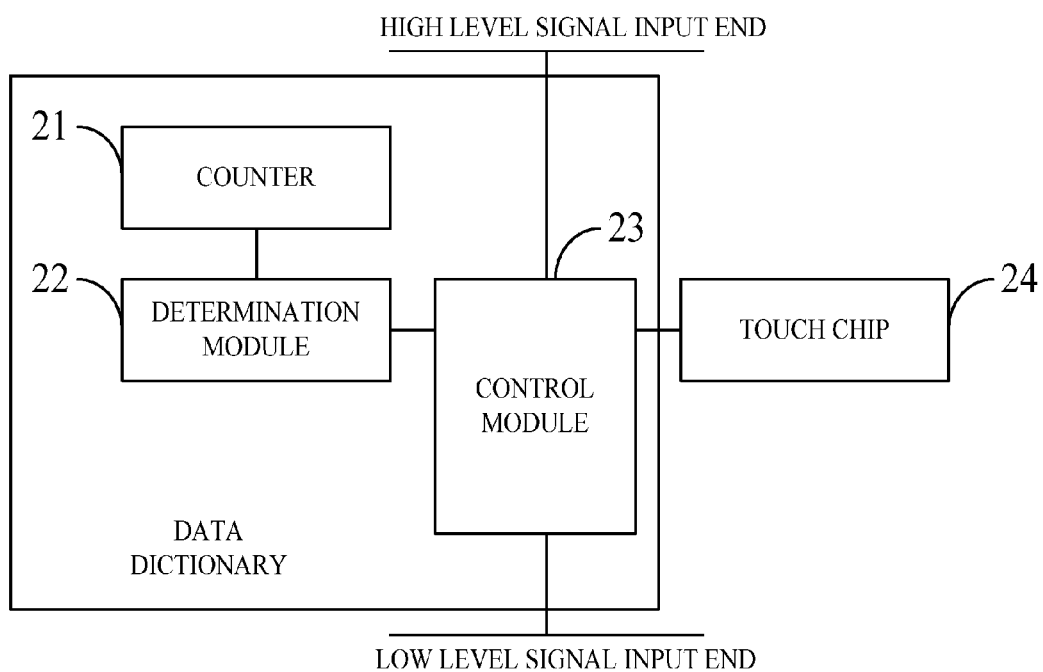
FIG. 6 is a second drawing illustrating the structure of the built-in touch display device according to another embodiment of the present disclosure.

As illustrated in FIG. 6, in a specific embodiment, the control module 23 may be connected to a high level input end and a low level input end respectively. When the determination module 22 determines that the gate line being in the ON state currently belongs to the first gate line groups 51, the control module 23 is electrically connected to the high level input end, i.e. the first signal may be in the high level, so as to control the touch chip 24 to transmit the touch driving signal to a corresponding one of the touch driving signal transmission lines 7; and when the determination module 22 determines that the gate line being in the ON state currently belongs to the second gate line groups 52, the control module 23 is electrically connected to the low level input end, i.e. the second signal line may be in the low level, so as to control the touch chip 24 to stop transmitting the touch driving signal to the corresponding one of the touch driving signal transmission lines 7.

In this embodiment, the counter 21, the determination module 22 and the control module 23 may be integrated in a data dictionary of the touch display device (DDIC).

In this embodiment, display driving and the touch detecting may be implemented simultaneously in the built-in touch display device. Thus, during a portion of the display period, the touch driving signal transmission lines 7 may transmit the touch driving signals (TX) to implement the touch detecting, which may adversely affect the data signals transmitted by the data lines (source) 2 on the first substrate 1.

Thus, in order to avoid the adverse effects of the touch driving signals and the data signals on each other, shielding layers 6 may be arranged between the data lines 2 and the touch driving electrodes 4 on the first substrate 1, so that the interferences between the touch driving signals and the data signals may be shielded. Thus, it further results in that the internal noises of the touch display device are reduced, and improves the display quality of the touch display device.

In this embodiment, a whole area for the shielding layer 6 on the first substrate 1 may be coated with a corresponding material as the shielding layer 6, so as to achieve a better shielding effect.

Furthermore, in this embodiment, for saving material and avoiding the shielding of the touch detecting signals, the shielding layer 6 may include a plurality of stripe patterns corresponding to the locations of the data lines 2, and one data line 2 may correspond to at least one stripe pattern.

In a specific embodiment, as illustrated in FIGS. 1 and 4, the data lines 2 and the stripe patterns of the shielding layers 6 may be in one-to-one correspondence, and thus a projection region of one data line 2 on the first substrate 1 may be totally within a projection region of the stripe pattern of the shielding layer 6 corresponding to the one data line 2 on the first substrate 1, i.e. the stripe pattern of the shielding layer 6 totally covers the corresponding one data line 2, so that the adverse effects of the touch driving signals and the data signals on each other are avoided.

Figure 7:
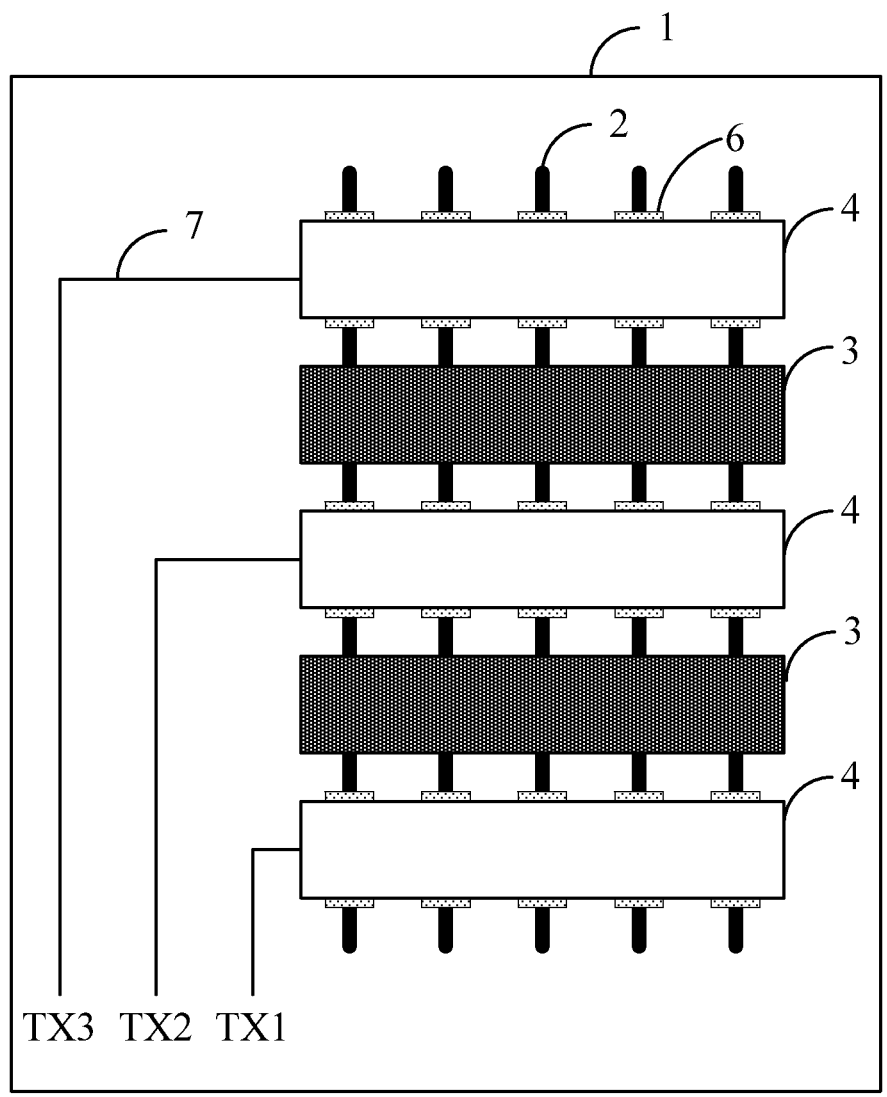
FIG. 7 is a fourth drawing illustrating the structure of the first substrate in the built-in touch display device according to still yet another embodiment of the present disclosure.

In a further embodiment, as illustrated in FIG. 7, one data line 2 may correspond to the stripe patterns of a plurality of the shielding layers 6, and the tripe patterns of the plurality of shielding layers 6 corresponding to the one data line 2 may be arranged at a position corresponding to an overlapping area of the projections of the data line 2 and the touch driving electrode 4 on the shielding layer 6. As a result, not only the interferences between the touch driving signals and the data signals may be avoided, but also the material of the shielding layers 6 may be further saved to reduce the adverse effects on the touch detecting.

In this embodiment, the material of the shielding layer 6 may be a transparent and conductive material, for example indium tin oxide (ITO), so as to avoid the adverse effects on the display of the touch display device.

Furthermore, the shielding layer 6 may be connected to a signal input end (for example, the common electrode 3) having a constant level, so as to discharge the electrostatic charges on the shielding layer 6.

Figure 8:
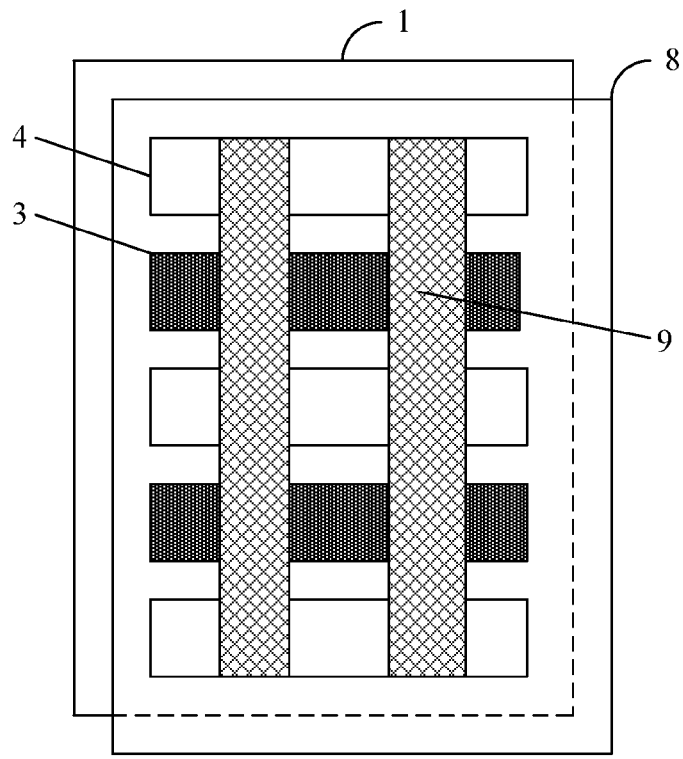
FIG. 8 is a third drawing illustrating the structure of the built-in touch display device according to yet another embodiment of the present disclosure.

In this embodiment, the first substrate 1 included in the built-in touch display device may be an array substrate, and the built-in touch display device may further include a second substrate 8 which may be a color filter substrate. The second substrate 8 may include components for displaying, components for touch detecting and etc. For example, the second substrate 8 includes a plurality of detection electrodes 9 arranged to be intersected with the touch driving electrodes 4. Alternatively, as illustrated in FIG. 8, the plurality of detection electrodes 9 and the plurality of touch driving electrodes 4 intersect at a substantially right angle.

Figure 9:
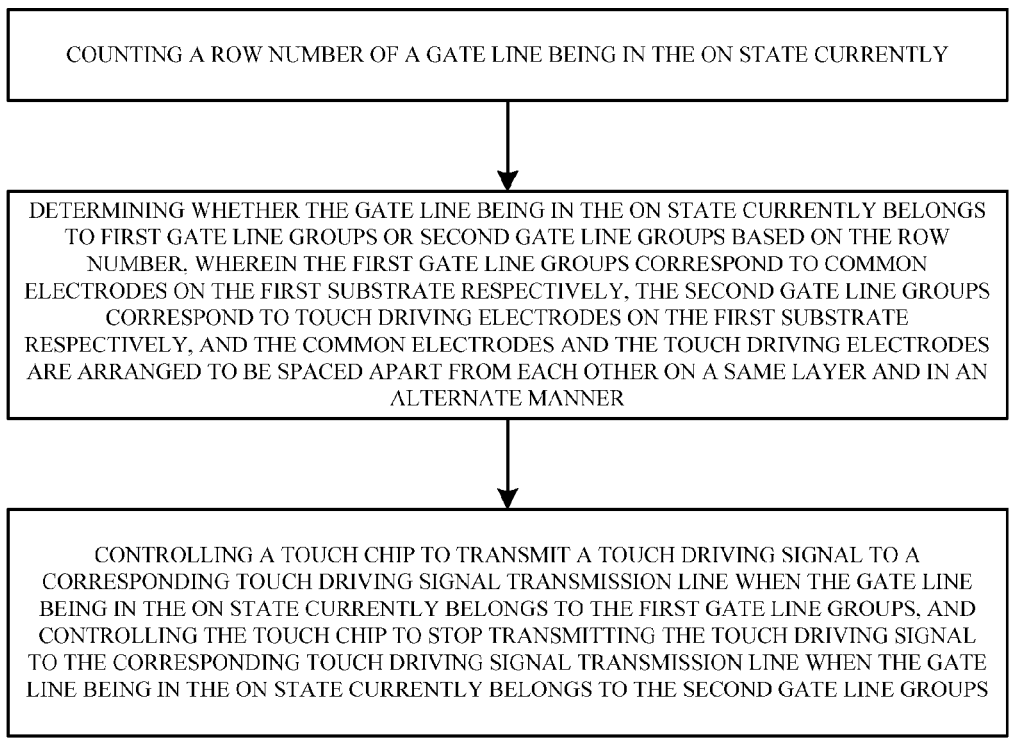
FIG. 9 illustrates a flow chart of a method for driving the built-in touch display device according to an embodiment of the present disclosure.

In another aspect of the present disclosure, it is further provided a method for driving a built-in touch display device. As illustrated in FIG. 9, the method includes steps of:

counting a row number of a gate line being in the ON state currently;

determining whether the gate line being in the ON state currently belongs to first gate line groups or second gate line groups based on the row number, wherein the first gate line groups correspond to common electrodes 3 on the first substrate respectively, the second gate line groups correspond to touch driving electrodes 4 on the first substrate respectively, and the common electrodes 3 and the touch driving electrodes 4 are arranged to be spaced apart from each other on a same layer and in an alternate manner; and controlling a touch chip 24 to transmit a touch driving signal to a corresponding touch driving signal transmission line 7 when the gate line being in the ON state currently belongs to the first gate line groups, and controlling the touch chip 24 to stop transmitting the touch driving signal to the corresponding touch driving signal transmission line 7 when the gate line being in the ON state currently belongs to the second gate line groups.

The step of controlling the touch chip 24 to transmit the touch driving signal to the corresponding touch driving signal transmission line 7 includes:

transmitting a high level signal to the touch chip 24 to control the touch chip 24 to transmit the touch driving signal to the corresponding touch driving signal transmission line 7.

The step of controlling the touch chip 24 to stop transmitting the touch driving signal to the corresponding touch driving signal transmission line 7 includes:

transmitting a low level signal to the touch chip 24 to control the touch chip 24 to stop transmitting the touch driving signal to the corresponding touch driving signal transmission line 7.

It can be seen from above that the present disclosure provides a built-in touch display device and a method for driving the same. Each of a plurality of shielding layers is arranged between each of the plurality of data lines and each of a plurality of touch driving electrodes. A touch driving signal is transmitted to the corresponding touch driving electrode when any gate line of the plurality of first gate line groups corresponding to the common electrodes is in an ON state, and the transmitting of the touch driving signal to the corresponding touch driving electrode is stopped when any gate line of the plurality of second gate line groups corresponding to the touch driving electrodes is in an ON state. As a result, the display driving and the touch detecting are implemented simultaneously, so that the time duration for the touch detecting is prolonged, and the frequency for transmitting the touch detecting signals is reduced. Thus, the noises of the touch display device are reduced, and the display quality of the touch display device is improved.

The optional embodiments of the present disclosure have been discussed. It is appreciated that many modifications and polishes may be made to the present disclosure without departing from the principle of the present disclosure for those skilled in the art. These modifications and polishes should also be deemed to be fallen within the scope of the present disclosure.

What is claimed is:

1. A built-in touch display device, comprising a first substrate, on which a plurality of data lines, and a plurality of common electrodes and a plurality of touch driving electrodes arranged to be spaced apart from each other and in an alternate manner on a same layer, are provided, wherein the plurality of common electrodes corresponds to a plurality of first gate line groups respectively, and the plurality of touch driving electrodes corresponds to a plurality of second gate line groups respectively, wherein the first substrate further comprises:
a plurality of shielding layers, each of which is arranged between each of the plurality of data lines and a corresponding one of the plurality of touch driving electrodes; and a plurality of touch driving signal transmission lines, arranged in one-to-one correspondence with the plurality of touch driving electrodes, wherein each of the touch driving signal transmission lines is electrically connected to a corresponding one of the plurality of touch driving electrodes, and configured to transmit a touch driving signal to the corresponding touch driving electrode when any one of the plurality of first gate line groups corresponding to the common electrodes is in an ON state, and stop transmitting the touch driving signal to the corresponding touch driving electrode when any one of the plurality of second gate line groups corresponding to the touch driving electrodes is in an ON state.

2. The built-in touch display device according to claim 1, wherein the shielding layers each comprises a plurality of stripe patterns.

3. The built-in touch display device according to claim 2, wherein a first data line of the plurality of data lines corresponds to a first stripe pattern of the plurality of stripe patterns; and a projection region of the first data line on the first substrate is within a projection region of the first stripe pattern corresponding to the data line on the first substrate.

4. The built-in touch display device according to claim 3, further comprising:

a counter, arranged to count a row number of a gate line being in the ON state currently;

a determination module, arranged to determine whether the gate line being in the ON state currently belongs to the first gate line groups or the second gate line groups based on the row number counted by the counter; and a control module, arranged to send a first signal to a touch chip for controlling the touch chip to transmit the touch driving signal to a corresponding one of the touch driving signal transmission lines when the determination module determines that a gate line being in the ON state currently belongs to the first gate line groups, and send a second signal to a touch chip for controlling the touch chip to stop transmitting the touch driving signal to the corresponding one of the touch driving signal transmission lines when the determination module determines that the gate line being in the ON state currently belongs to the second gate line groups.

5. The built-in touch display device according to claim 2, wherein one of the plurality of data lines corresponds to the plurality of stripe patterns; and the plurality of stripe patterns corresponding to the one data line is arranged on the shielding layer at a position corresponding to a region where a projection of the one data line overlaps a projection of the corresponding touch driving electrode.

6. The built-in touch display device according to claim 5, further comprising:

a counter, arranged to count a row number of a gate line being in the ON state currently;

a determination module, arranged to determine whether the gate line being in the ON state currently belongs to the first gate line groups or the second gate line groups based on the row number counted by the counter; and a control module, arranged to send a first signal to a touch chip for controlling the touch chip to transmit the touch driving signal to a corresponding one of the touch driving signal transmission lines when the determination module determines that a gate line being in the ON state currently belongs to the first gate line groups, and send a second signal to a touch chip for controlling the touch chip to stop transmitting the touch driving signal to the corresponding one of the touch driving signal transmission lines when the determination module determines that the gate line being in the ON state currently belongs to the second gate line groups.

7. The built-in touch display device according to claim 2, further comprising:
 a counter, arranged to count a row number of a gate line being in the ON state currently;
 a determination module, arranged to determine whether the gate line being in the ON state currently belongs to the first gate line groups or the second gate line groups based on the row number counted by the counter; and
 a control module, arranged to send a first signal to a touch chip for controlling the touch chip to transmit the touch driving signal to a corresponding one of the touch driving signal transmission lines when the determination module determines that a gate line being in the ON state currently belongs to the first gate line groups, and send a second signal to a touch chip for controlling the touch chip to stop transmitting the touch driving signal to the corresponding one of the touch driving signal transmission lines when the determination module determines that the gate line being in the ON state currently belongs to the second gate line groups.

8. The built-in touch display device according to claim 1, wherein the shielding layers are each made of a transparent and conductive material.

9. The built-in touch display device according to claim 8, wherein the shielding layers are each made of Indium Tin Oxide (ITO).

10. The built-in touch display device according to claim 8, further comprising:
 a counter, arranged to count a row number of a gate line being in the ON state currently;
 a determination module, arranged to determine whether the gate line being in the ON state currently belongs to the first gate line groups or the second gate line groups based on the row number counted by the counter; and
 a control module, arranged to send a first signal to a touch chip for controlling the touch chip to transmit the touch driving signal to a corresponding one of the touch driving signal transmission lines when the determination module determines that a gate line being in the ON state currently belongs to the first gate line groups, and send a second signal to a touch chip for controlling the touch chip to stop transmitting the touch driving signal to the corresponding one of the touch driving signal transmission lines when the determination module determines that the gate line being in the ON state currently belongs to the second gate line groups.

11. The built-in touch display device according to claim 1, wherein each of the shielding layers is connected to a corresponding signal input end having a constant level.

12. The built-in touch display device according to claim 11, wherein, for each of the shielding layers, the corresponding signal input end is one of the common electrodes.

13. The built-in touch display device according to claim 1, further comprising:
 a counter, arranged to count a row number of a gate line being in the ON state currently;
 a determination module, arranged to determine whether the gate line being in the ON state currently belongs to the first gate line groups or the second gate line groups based on the row number counted by the counter; and
 a control module, arranged to send a first signal to a touch chip for controlling the touch chip to transmit the touch driving signal to a corresponding one of the touch driving signal transmission lines when the determination module determines that a gate line being in the ON state currently belongs to the first gate line groups, and send a second signal to a touch chip for controlling the touch chip to stop transmitting the touch driving signal to the corresponding one of the touch driving signal transmission lines when the determination module determines that the gate line being in the ON state currently belongs to the second gate line groups.

14. The built-in touch display device according to claim 13, wherein the control module is connected to a high level input end and a low level input end respectively;
 when the determination module determines that the gate line being in the ON state currently belongs to the first gate line groups, the control module is electrically connected to the high level input end, and transmits a high level signal inputted by the high level input end to the touch chip; and
 when the determination module determines that the gate line being in the ON state currently belongs to the second gate line groups, the control module is electrically connected to the low level input end, and transmits a low level signal inputted by the low level input end to the touch chip.

15. The built-in touch display device according to claim 13, wherein the counter, the determination module and the control module are integrated in a data dictionary of the built-in touch display device.

16. The built-in touch display device according to claim 1, further comprising a second substrate,
 wherein a plurality of detection electrodes is provided on the second substrate.

17. The built-in touch display device according to claim 16, wherein the detection electrodes and the touch driving electrodes intersect at a substantially right angle.

18. A method for driving a built-in touch display device, comprising steps of:
 counting a row number of a gate line being in an ON state currently;
 determining whether the gate line being in the ON state currently belongs to first gate line groups or second gate line groups based on the row number, wherein the first gate line groups correspond to common electrodes respectively, the second gate line groups correspond to touch driving electrodes respectively, and the common electrodes and the touch driving electrodes are arranged to be spaced apart from each other on a same layer and in an alternate manner; and
 controlling a touch chip to transmit a touch driving signal to a corresponding touch driving signal transmission line when the gate line being in the ON state currently belongs to the first gate line groups, and controlling the touch chip to stop transmitting the touch driving signal to the corresponding touch driving signal transmission line when the gate line being in the ON state currently belongs to the second gate line groups.

19. The method according to claim 18, wherein the step of controlling the touch chip to transmit the touch driving signal to the corresponding touch driving signal transmission line comprises:
 transmitting a high level signal to the touch chip to control the touch chip to transmit the touch driving signal to the corresponding touch driving signal transmission line.

20. The method according to claim 18, wherein the step of controlling the touch chip to stop transmitting the touch driving signal to the corresponding touch driving signal transmission line comprises:

transmitting a low level signal to the touch chip to control the touch chip to stop transmitting the touch driving signal to the corresponding touch driving signal transmission line.

* * * * *